(12) United States Patent
Ozeki

(10) Patent No.: US 12,704,832 B2
(45) Date of Patent: Aug. 11, 2026

(54) MACHINING OPERATION ASSISTING DEVICE AND STORAGE MEDIUM

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 375 days.

(21) Appl. No.: 18/549,349

(22) PCT Filed: Mar. 24, 2022

(86) PCT No.: PCT/JP2022/014118
§ 371 (c)(1),
(2) Date: Sep. 7, 2023

(87) PCT Pub. No.: WO2022/210294
PCT Pub. Date: Oct. 6, 2022

(65) Prior Publication Data
US 2024/0152119 A1 May 9, 2024

(30) Foreign Application Priority Data
Mar. 30, 2021 (JP) ................................ 2021-057228

(51) Int. Cl.
*G05B 19/418* (2006.01)
*G05B 23/02* (2006.01)

(52) U.S. Cl.
CPC ... *G05B 19/4183* (2013.01); *G05B 19/41865* (2013.01); *G05B 23/0235* (2013.01); *G05B 2219/31022* (2013.01)

(58) Field of Classification Search
CPC .......... G05B 19/4183; G05B 19/41865; G05B 23/0235; G05B 2219/31022
See application file for complete search history.

(56) References Cited

U.S. PATENT DOCUMENTS

| | | | | |
|---|---|---|---|---|
| 3,699,317 | A | 10/1972 | Middleditch | |
| 5,402,354 | A | 3/1995 | Okino et al. | |
| 2009/0072631 | A1 | 3/2009 | Iida et al. | |
| 2014/0343712 | A1* | 11/2014 | Bauer ................. | G05B 19/409 700/172 |

(Continued)

FOREIGN PATENT DOCUMENTS

| | | |
|---|---|---|
| CN | 101142063 A | 3/2008 |
| CN | 109313438 A | 2/2019 |

(Continued)

*Primary Examiner* — Michael W Choi
(74) *Attorney, Agent, or Firm* — HAUPTMAN HAM, LLP

(57) ABSTRACT

A numerical control device as a machining operation assisting device extracts an operation item whose necessity changes depending on the operating state of a machine tool, determines the necessity of the operation item based on the operating condition of the machine tool, adds the necessity to the operation item, and determines the presence or absence of an operation to be executed by an operator based on the necessity added to the operation item. Then, a screen of a display unit of the numerical control device as the machining assisting device, a terminal device of the operator, or a computer managing the machine tool in a factory, for example, is informed of the determined necessity of the operation item.

9 Claims, 9 Drawing Sheets

(56) References Cited

U.S. PATENT DOCUMENTS

| | | | | |
|---|---|---|---|---|
| 2016/0184947 | A1* | 6/2016 | Itou | B23Q 11/0046 15/319 |
| 2016/0243635 | A1* | 8/2016 | Abe | B23H 7/102 |
| 2017/0091667 | A1 | 3/2017 | Yukawa | |
| 2017/0146985 | A1 | 5/2017 | Maeda | |
| 2019/0302731 | A1 | 10/2019 | Kettemer et al. | |
| 2023/0384752 | A1* | 11/2023 | Rodriguez | G05B 19/41835 |

FOREIGN PATENT DOCUMENTS

| | | | |
|---|---|---|---|
| JP | H07-237090 | A | 9/1995 |
| JP | 2003-022129 | A | 1/2003 |
| JP | 2010-146537 | A | 7/2010 |
| JP | 2016-153158 | A | 8/2016 |
| JP | 2017-068566 | A | 4/2017 |
| JP | 2017-097566 | A | 6/2017 |
| JP | 2020-052592 | A | 4/2020 |
| WO | 2018/011849 | A1 | 1/2018 |

* cited by examiner

| OPERATION ITEM | GRAPH THRESHOLD | AREA THRESHOLD |
|---|---|---|
| RE-MEASUREMENT OF TOOL OFFSET (HIGH DIMENSIONAL ACCURACY REQUIRED, AND UNATTENDED OPERATION IS EXCLUDED) | Th_A | Th_B |

TEMPERATURE
Th_C
TIME
AREA > Th_D1 (NECESSITY: LOW)
AREA > Th_D2 (NECESSITY: HIGH)
AREA > Th_D3 (NECESSARY)

FIG.5

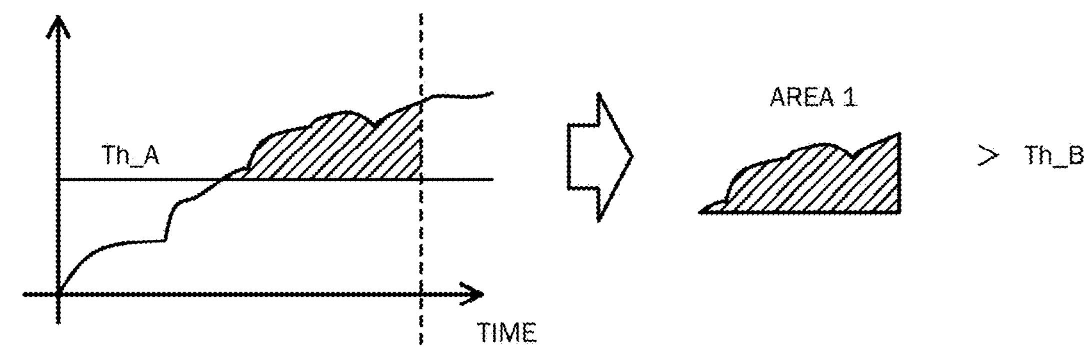

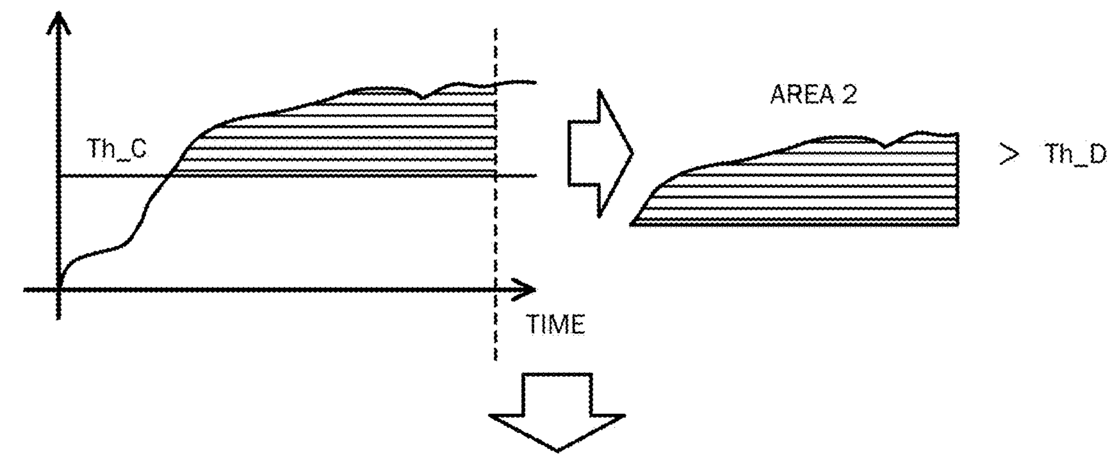

| | AREA | WEIGHTING FACTOR | EVALUATION VALUE |
|---|---|---|---|
| TEMPERATURE | AREA 1 | $\alpha 1$ | AREA 1× $\alpha 1$ |
| CUTTING TORQUE | AREA 2 | $\alpha 2$ | AREA 2× $\alpha 2$ |

IF Th_Total < (AREA 1× $\alpha 1$) + (AREA 2× $\alpha 2$),
THE OPERATION ITEM IS DETERMINED TO BE NECESSARY.

| OPERATION ITEM | GRAPH THRESHOLD | AREA THRESHOLD | WEIGHTING FACTOR |
|---|---|---|---|
| MEASUREMENT OF POSITIONAL DEVIATION OF CENTRAL AXIS OF ROTATING SHAFT | Th_A<br>Th_C | Th_B<br>Th_D | $\alpha 1$, $\alpha 2$ |
| RE-MEASUREMENT OF TOOL OFFSET | Th_A<br>Th_C | Th_B<br>Th_D | $\alpha 1$, $\alpha 2$ |

FIG.6
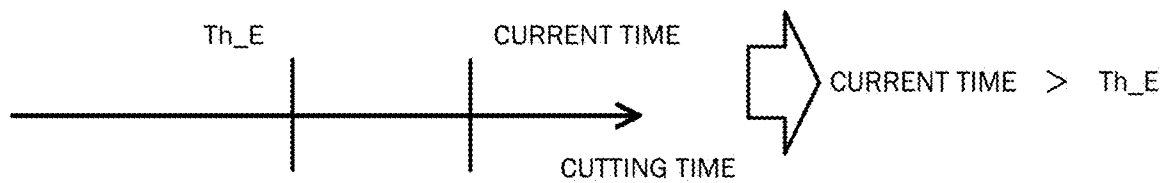
OR CONDITION
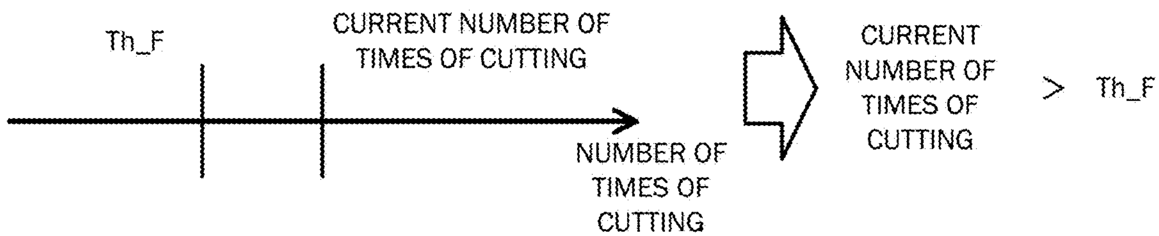
| OPERATION ITEM | TIME THRESHOLD NUMBER-OF-TIMES THRESHOLD |
|---|---|
| RE-APPLICATION OF PASTE TO TOOL | Th_1 or Th_2 |
| REMOVAL OF CHIPS | Th_3 or Th_4 |
FIG.7
| OPERATION ITEM | NECESSITY |
|---|---|
| MEASUREMENT AND CORRECTION OF POSITIONAL DEVIATION OF CENTRAL AXIS OF ROTATING SHAFT OF TABLE, ETC. | HIGH |
| RE-MEASUREMENT OF TOOL OFFSET | HIGH |
| APPLICATION OF PASTE TO TOOL | LOW |
| REMOVAL OF CHIPS | LOW |

START
EXTRACT OPERATION ITEMS
S1
ADD NECESSITY TO EACH OPERATION ITEM
S2
S3
ANY NECESSARY OPERATION?
NO
YES
S4
MACHINE TOOL NEEDS TO BE STOPPED?
YES
S5
STOP MACHINE TOOL
NO
OUTPUT LIST OF OPERATION ITEMS
S6
OUTPUT WARNING ALARM OR SCREEN
S7
S8
NEXT DETERMINATION STARTED?
YES
NO
END

MACHINING OPERATION ASSISTING DEVICE AND STORAGE MEDIUM

RELATED APPLICATIONS

The present application is a National Phase of International Application No. PCT/JP2022/014118 filed Mar. 24, 2022, which claims priority to Japanese Application No. 2021-057228, filed Mar. 30, 2021.

TECHNICAL FIELD

The present invention relates to a machining operation assisting device for assisting in operation performed in a machine tool, and a storage medium.

BACKGROUND ART

Work instructions is a document that describes the procedures of a machining operation to be performed with a machine tool. The work instructions include information such as the number of operators, the operation time, the operation details, and the operation sequence, for example. The operation details are further divided into “manual operation,” “automatic machining,” “walk,” “wait in-process,” and “quality check,” for example. The work instructions are provided on a document or a screen to help an operator of the machine tool to execute operations in the order described in the work instructions.

The operator repeatedly executes the basic operation described in the work instruction, and thus uniform quality in machining can be achieved. However, it is impossible to describe all the operations in the work instructions, and in practice, an operation that is not described in the work instructions occurs depending on the operating state of the machine tool. To deal with such an operation, the operator determines the execution timing of the operation by himself/herself by observing the operating state of the machine tool. “Re-application of a paste to a tool” and “removal of chips” are some examples of an operation that requires operator’s determination.

There are also operations that do not require a determination to be made by an operator to improve machining accuracy. “Correction of deviation” resulting from “thermal displacement” and “re-measurement of offset” can be automatically executed using a physical model or a statistical model. For example, there is known a technique of, for automatically correcting thermal displacement using machine learning, learning an action value of a change amount of a tool compensation interval as a determined value using a workpiece processing error amount and a machine tool working ratio as state variables, which allows the frequency of tool compensation to be optimized, a processing error to be restrained within a desired range, and the machine tool working ratio to be improved. For example, see Patent Literature 1.

CITATION LIST

Patent Literature

[Patent Literature 1]
Japanese Patent Laid-Open No. 2017-68566

SUMMARY OF INVENTION

Technical Problem

Automatic correction of “thermal displacement” can be applied only to machining that does not require severe dimensional accuracy (i.e., a dimensional tolerance of greater than or equal to 5/100 mm to 6/100 mm). In addition, it is not enough to achieve accurate “correction of positional deviation of the central axis of a rotating shaft” by only applying machine learning to the technique of “correcting thermal displacement” or “correcting thermal displacement in the tool axis direction”.

To perform machining with severe dimensional accuracy (i.e., a dimensional tolerance in units of 1/1000 mm), it is necessary to manually correct “thermal displacement.” This is because correction that meets the severe dimensional accuracy requirements cannot be made automatically. Correction of “thermal displacement” is a burden for an operator because the operator has to make determination by themselves.

Other than correction of “thermal displacement”, there are various other operations that requires an operator make determination, such as “re-application of a paste to a tool” and “removal of chips.” To efficiently and thoroughly perform such operations, there is a need for a function of assisting an operator to make decision.

Therefore, in the field of machine tools, there is a need for a machining operation assisting device for assisting in the execution of an operation whose necessity changes depending on the operating state of a machine, and a storage medium.

Solution to Problem

A numerical control device according to an aspect of the present disclosure includes an operation item extraction unit that extracts an operation item whose necessity changes depending on an operating state of a machine tool; a necessity adding unit that determines the necessity of the operation item, and adds the necessity to the operation item; and a necessity determination unit that determines the presence or absence of an operation to be executed by an operator based on the necessity added to the operation item.

A computer-readable storage medium according to an aspect of the present disclosure has a computer-readable instruction stored therein, the instruction being configured to perform the following when executed by one or more processors: extracting an operation item whose necessity changes depending on an operating state of a machine tool; determining the necessity of the operation item; adding the necessity to the operation item; and determining the presence or absence of an operation to be executed by an operator based on the necessity added to the operation item.

Advantageous Effects of Invention

According to an aspect of the present invention, it is possible to assist in the execution of an operation whose necessity changes depending on the operating state of a machine tool.

BRIEF DESCRIPTION OF DRAWINGS

FIG. 5 is a view illustrating a method of determining the presence or absence of necessity based on two or more variables.

FIG. 6 is a view illustrating a method of determining the presence or absence of necessity based on two or more variables.

FIG. 7 is a chart illustrating an exemplary file obtained by associating each operation item with its necessity.

DESCRIPTION OF EMBODIMENTS

Figure 1:
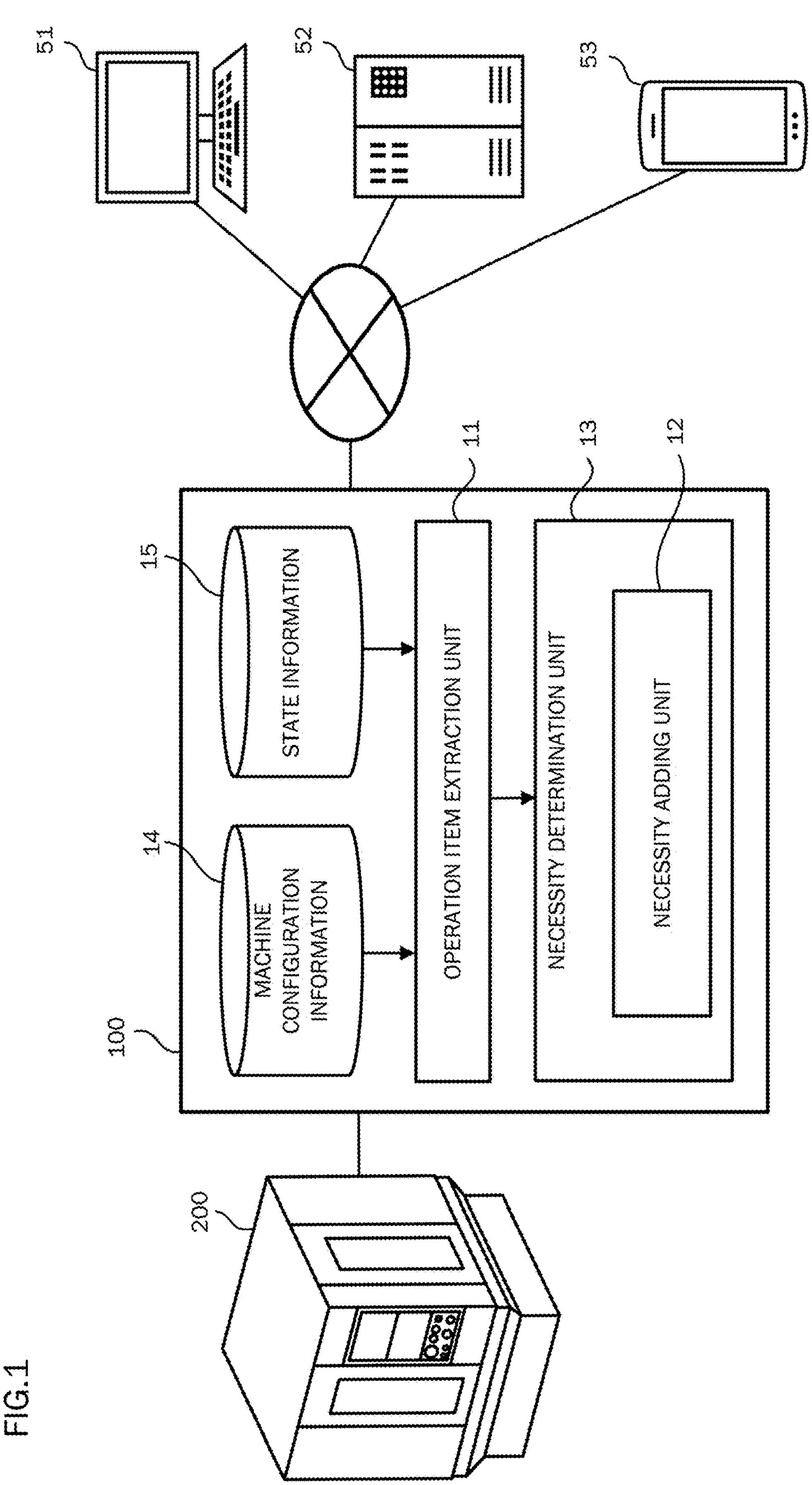
FIG. 1 is a block diagram of a numerical control device.

FIG. 1 is a block diagram of a numerical control device 100 as a machining operation assisting device. Although the present disclosure illustrates an example in which a machining operation assisting device is applied to the numerical control device 100, the target of application of the machining operation assisting device is not limited to the numerical control device 100 and may be other information processing devices, such as a PC (personal computer), a server, and a portable terminal.

The numerical control device 100 includes an operation item extraction unit 11 that extracts an operation item whose necessity changes depending on the operating state of a machine tool 200, a necessity adding unit 12 that adds necessity to each operation item, and a necessity determination unit 13 that determines the presence or absence of an operation to be executed by an operator based on the necessity of the operation item. The numerical control device 100 is integrated with the machine tool 200 or is connected to the machine tool 200, and receives information indicating the operating state of the machine tool 200 from the machine tool 200 and a sensor (not illustrated) provided in the machine tool 200 and from a PLC (Programmable Logic Controller) (not illustrated). The numerical control device 100 is connected to a PC 51, which is a computer managing the machine tool 200 in a factory, a server 52, which is a computer managing the machine tool 200, and a portable terminal 53 of the operator, for example, via a LAN (Local Area Network). The numerical control device 100 may also be connected to a wide area network, such as the Internet, via a LAN.

The operation item extraction unit 11 extracts an operation item whose necessity changes depending on the operating state of the machine from, for example, machine configuration information 14 indicating the presence or absence of a rotating shaft and the like, and state information 15 of the machine, such as dimensional tolerance, machining information indicating the presence or absence of a long-time operation performed and the like, temperature, operating time, cutting time for each tool, and torque. The machine configuration information 14 is registered on the numerical control device 100 in advance. The machining information may be read from a machining program, or may be input by the operator. The state information 15 is acquired from the machine tool 200 or the sensor, for example.

Examples of an operation item whose necessity changes depending on the operating state of the machine tool 200 include "correction of positional deviation of the central axis of the rotating shaft," "resetting of tool offset," "re-application of a paste to the tool," and "removal of chips."

The operation item extraction unit 11 determines based on the machine configuration information 14 if the machine tool 200 includes a rotating shaft of a table and the like. Thermal displacement of the central axis position of a rotating shaft of a table cannot be corrected automatically for example, and thus, it is necessary to determine the correction timing while observing the positional deviation and changes in temperature. The operation item extraction unit 11 extracts an operation item whose necessity changes depending on the operating state of the machining tool 200, for example, a rotating shaft of a table in the machine configuration information 14 is an item to be extracted.

Even when automatic correction of thermal displacement is set ON, it is necessary to reset the tool offset because the tool wears. The operation item extraction unit 11 extracts "re-measurement of tool offset" as an operation item whose necessity changes depending on the operating state of the machine tool 200. Meanwhile, when the dimensional accuracy requirements are severe (i.e., a dimensional tolerance in units of 1/1000 mm), automatic correction of thermal displacement is impossible. If automatic correction of thermal displacement is intentionally turned OFF, it becomes necessary to adjust the tool offset value for absorbing the thermal displacement. When the dimensional accuracy requirements are severe, "resetting of tool offset (manual correction of thermal displacement)" is extracted as an operation item whose necessity changes depending on the operating state of the machine tool 200.

Re-applying a paste is an operation for preventing the gradual decrease of the paste for suppressing the wear of the tool. The necessity of re-applying the paste differs depending on the operating state of the machine tool 200, such as the cutting time and the number of times of cutting performed. Thus, "re-application of a paste to the tool" is extracted as an operation item whose necessity changes depending on the operating state of the machine tool 200.

Chips that cannot be completely washed away with a cutting fluid also accumulate gradually. The necessity of removing chips changes depending on the operating state of the machine tool 200, such as the cutting time and the number of times of cutting performed. Thus, "removal of chips" is extracted as an operation item whose necessity changes depending on the operating state of the machine tool 200.

The necessity determination unit 13 determines the presence or absence of an operation to be executed by the operator based on the necessity of the operation item the operation item extraction unit 11 extracted.

The necessity determination unit 13 includes the necessity adding unit 12 that determines the necessity of each operation item, and adds the necessity to the operation item.

The necessity adding unit 12 determines the necessity of each operation item based on the operating time of the machine tool 200 and the sensor value, and adds the determination result to the operation item. The necessity adding unit 12 calculates the necessity of each operation item based on information detected by the machine tool 200 or the sensor, such as changes in temperature, cutting torque, a load on a main shaft, a load on a feed shaft, vibration, the cutting time, the number of times of cutting performed, and materials of a workpiece.

There are some methods for calculating the necessity such as: a method of "determining the presence or absence of the necessity of the operation": a method of "determining the necessity of the operation in advance": a method of "determining the time necessary to perform the operation": a method of "representing the necessity by a degree": and a method of "calculating the necessity based on two or more variables."

Figure 2:
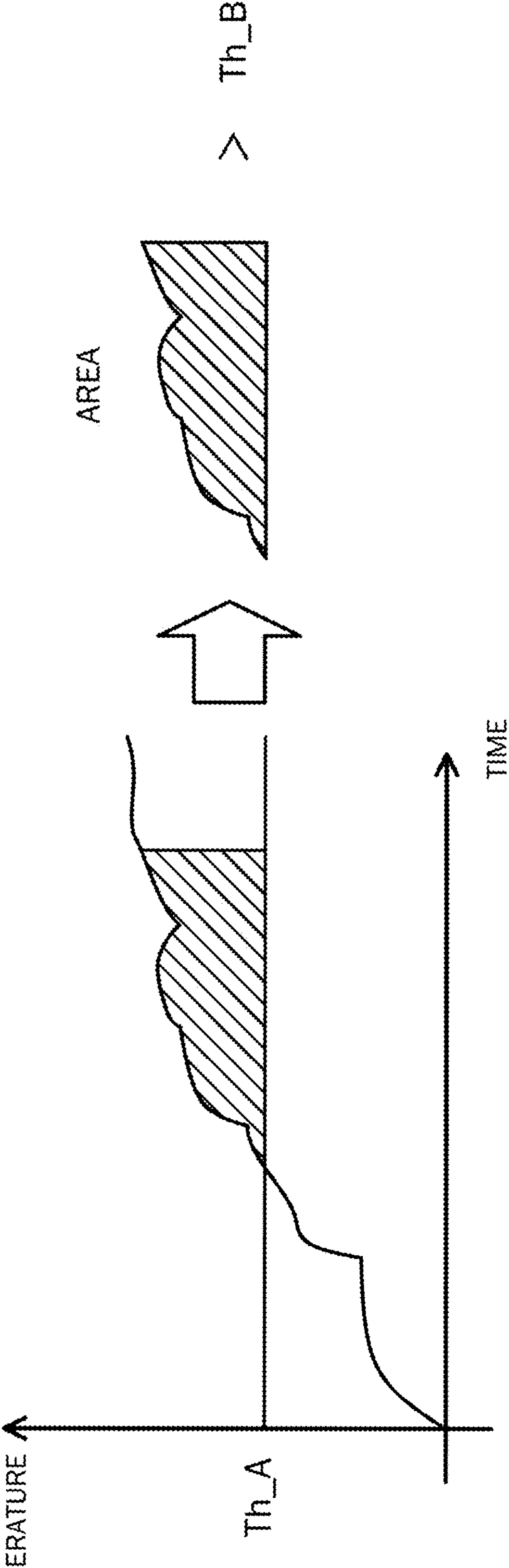
FIG. 2 is a view illustrating a method of determining the presence or absence of necessity.

In the method of "determining the presence or absence of the necessity," it is determined if the operation is necessary. FIG. 2 illustrates an example of a method of determining a necessity of the operation item "re-measurement of tool offset.". A table in FIG. 2 illustrates two thresholds: a "graph threshold: Th_A" and an "area threshold: Th_B" for calculating the necessity of the "re-measurement of tool offset". The necessity adding unit 12 calculates the area of the temperature of the tool that is greater than the "graph threshold: Th_A," and if the calculated area is greater than the "the area threshold: Th_B," the necessity adding unit 12 determines that the operation item "re-measurement of tool offset" is "necessary." Meanwhile, if the calculated area is less than the "area threshold: Th_B", the necessity adding unit 12 determines that the operation item "re-measurement of tool offset" is "not necessary."

Figure 3:
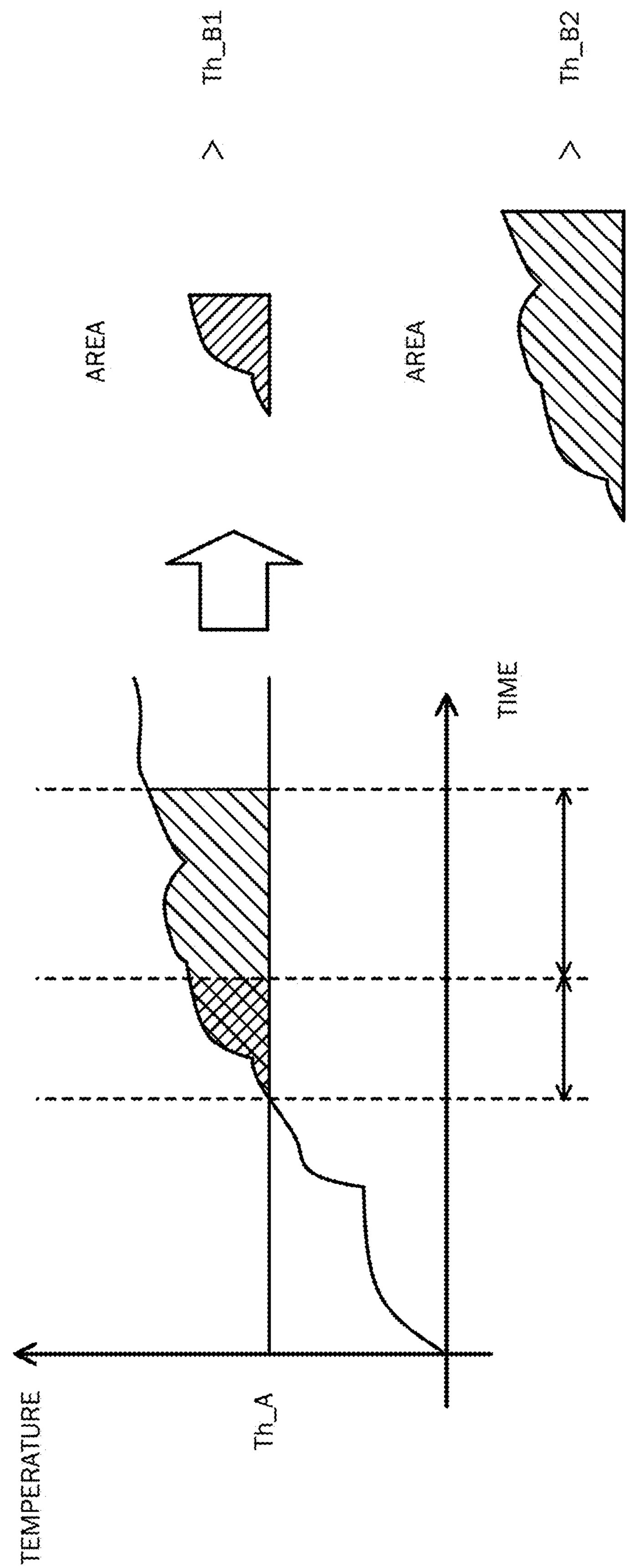
FIG. 3 is a view illustrating a method of determining the necessity of an operation in advance.

In the method of "determining the necessity of the operation in advance", a plurality of "area thresholds" described above are prepared, and the necessity of the operation is determined in advance when the calculated area exceeded a first threshold. FIG. 3 illustrates an example of a method of determining a necessity of the operation item "re-measurement of tool offset". An "area threshold: Th_B1" is a threshold for determining the necessity of the operation in advance, and an "area threshold: Th_B2" is a threshold for determining that the execution of the operation is necessary. The necessity adding unit 12 monitors the temperature of the tool, and when the calculated area has reached the "area threshold: Th_B1," the necessity adding unit 12 determines that the operation will be necessary in a short time, and when the calculated area has reached the "area threshold: Th_B2," the necessity adding unit 12 determines that the operation became necessary.

In the method of "calculating the time necessary to perform the operation", the proportion of the foregoing "area threshold" is calculated. The necessity adding unit 12 predicts the time required to correct thermal displacement from the proportion of the "area threshold." Note that the time required to perform the operation of correcting thermal displacement may be predicted using a statistical model or a physical model obtained through machine learning, for example.

Figure 4:
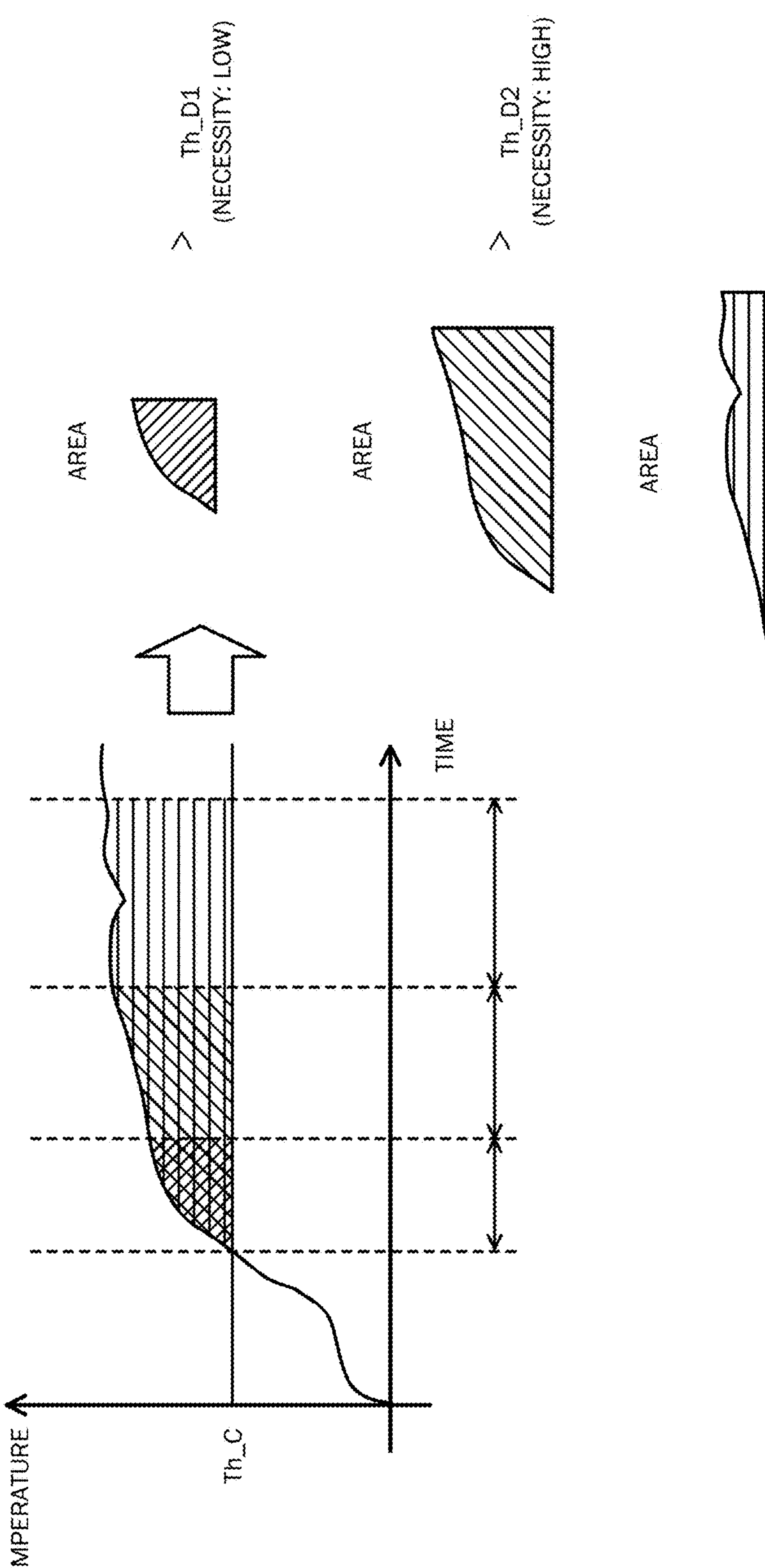
FIG. 4 is a view illustrating a method of representing necessity by a degree.

In the method of "representing the necessity by a degree," a plurality of "area thresholds" described above are prepared, and when the calculated area has exceeded a specific threshold, the necessity is changed from "low" to "high." FIG. 4 illustrates an example of a method of determining a necessity of the operation item "re-measurement of tool offset". An "area threshold: Th_D1" is a threshold for determining the necessity of the operation item in advance. An "area threshold: Th_D2" is a threshold for changing the necessity from "low" to "high." An "area threshold: Th_D3" is a threshold for determining that the operation item is necessary. The necessity adding unit 12 monitors the temperature of the tool. When the calculated area has reached the "area threshold: Th_D1," the necessity adding unit 12 determines that the operation will be necessary in time, and sets the "necessity" to "low." When the calculated area has reached the "area threshold: Th_D2," the necessity adding unit 12 changes the "necessity" to "high." When the calculated area has reached the "area threshold: Th_D3," the necessity adding unit 12 determines that the operation is necessary.

FIG. 5 illustrates an example of a method of "determining the presence or absence of necessity based on two or more variables". In the example of FIG. 5, the presence or absence of the necessity of each of the operation item "measurement of positional deviation of the central axis of the rotating shaft" and the operation item "re-measurement of tool offset due to wear" is determined based on two factors "temperature" and "cutting torque" of the machine tool.

An example will be described in which the two factors "temperature" and "cutting torque" have influence on the "positional deviation of the central axis of the rotating shaft". As used herein, the "rotating shaft" is the shaft rotating the table on which the workpiece is placed. The workpiece is fixed on the table, and thus, the workpiece rotates with the rotation of the table. With the rotation of the workpiece, heat is generated by cutting work. A graph (upper) in FIG. 5 illustrates changes in the temperature of the rotating shaft with time. A threshold Th_A indicates the temperature that has influence on the thermal displacement. When the temperature of the rotating shaft is not over the threshold Th_A, the temperature has no influence on the thermal displacement regardless of whether there is any temperature change. When the temperature of the rotating shaft has exceeded Th_A, the temperature has influence on the thermal displacement. The product of the temperature above the threshold Th_A and the time (i.e., an area 1) corresponds to the amount of heat applied to the rotating shaft. When the amount of heat has exceeded a threshold Th_B, thermal displacement may occur.

A graph (lower) in FIG. 5 illustrates changes in the cutting torque with time. Since the workpiece is fixed on the table, if the workpiece is cut with a strong cutting force, a load is applied to the table, thus influencing the positional deviation of the center of the rotating shaft of the table. When the cutting torque is not over a threshold Th_C, the cutting torque has no influence on the positional deviation of the rotating shaft. When the cutting torque has exceeded Th_C, the cutting torque has influence on the positional deviation of the rotating shaft. The product of the cutting torque above the threshold Th_C and the time (i.e., an area 2) corresponds to stress applied to the rotating shaft.

As described above, the "positional deviation of the central axis of the rotating shaft" is influenced by the two interrelated factors "temperature" and "cutting torque." A table (upper) in FIG. 5 describes a weighting factor $\alpha 1$ for the temperature (i.e., the amount of heat: the area 1), a weighting factor $\alpha 2$ for the cutting torque (i.e., stress: the area 2), the evaluation value of the temperature "area $1\times\alpha 1$," and the evaluation value of the stress "area $2\times\alpha 2$." The numerical control device 100 determines that the operation item "measurement of the positional deviation of the central axis of the rotating shaft" is necessary when the sum of the evaluation value of the temperature "area $1\times\alpha 1$" and the evaluation value of the stress "area $2\times\alpha 2$" is greater than a threshold Th_Total. The weighting factors "$\alpha 1$" and "$\alpha 2$" also serve the role of adapting the units of "temperature" and "cutting torque," which are the elements with different physical quantities, to each other. The method of "determining the presence or absence of necessity based on two or more variables" is not limited to the foregoing method, and an appropriate mathematical model or machine learning may be used.

FIG. 6 illustrates another method of "determining the presence or absence of necessity based on two or more variables". In the example of FIG. 6, two elements "the cutting time" and "the number of times of cutting performed" have individual thresholds, and when at least one of the two elements satisfies its threshold condition, it is determined that the relevant operation item is necessary.

In the example of FIG. 6, the two elements "the cutting time" and "the number of times of cutting performed" respectively have thresholds "Th_E" and "Th_F." The numerical control device 100 compares the threshold "Th_E" with "the current cutting time", and if a condition "the current cutting time>Th_E" is satisfied, it is determined that the relevant operation item is necessary. Alternatively, the numerical control device 100 compares the threshold "Th_F" with "the current number of times of cutting performed," and if a condition "the current number of times of cutting performed >Th_F" is satisfied, it is determined that the relevant operation item is necessary.

The two elements correspond to an "OR condition," and if one of the two elements satisfies its threshold condition, the relevant operation item is determined to be "necessary." With such a method, it is possible to determine if the operation item "re-application of a paste to the tool" or "removal of chips" is necessary. The numerical control device 100 stores the thresholds for each operation item. A table in FIG. 6 illustrates a "time threshold: Th_1" and a "number-of-times threshold: Th_2" for determining the necessity of the operation item "re-application of a paste to the tool," and a "time threshold: Th_3" and a "number-of-times threshold: Th_4" for determining the necessity of the operation item "removal of chips".

Methods described above in which the determination is made based on one variable such as: a method of "determining the necessity of the operation in advance;" a method of "calculating the time necessary to perform the operation;" and a method of "representing the necessity by a degree;" can be applied to "determine the presence or absence of necessity based on two or more variables.". That is, it is possible to predict the necessity of the operation in advance, calculate the time necessary to perform the operation, and rank the necessity of the operations, based on two or more variables.

The necessity adding unit 13 creates a file by associating each operation item with its necessity. FIG. 7 illustrates an exemplary file. In the file of FIG. 7, each operation item is associated with its necessity such that the "operation item: measurement and correction of the positional deviation of the central axis of the rotating shaft of the table, etc." is associated with its "necessity: high," the "operation item: re-measurement of tool offset" is associated with its "necessity: high", the "operation item: application of paste to the tool" is associated with its "necessity: low," and the "operation item: removal of chips" is associated with its "necessity: low."

The necessity determination unit 12 refers to the necessity added to each operation item, and if there is at least one operation item that is necessary, the necessity determination unit 12 "stops the machine tool" and "outputs the operation item."

In "stopping the machine tool", if there is any operation with the "necessity: high" (or that is necessary), the next machining operation or a machining operation in the next step is prohibited.

In "outputting the operation item," if there is at least one operation item determined to be necessary (including an operation item with the "necessity: low," "an operation item for which the necessary has been determined in advance," and an "operation item for which a time necessary to perform the operation has been calculated"), it is possible to output a "list of operation items" and thus output information on the necessity to each operation item added to the list to at least one of a screen of the numerical control device 100 and an external information processing device, such as the PC 51, the server 52, or the portable terminal 53.

The PC 51, the server 52, and the portable terminal 53 may execute at least one of display of an operation screen, direction to the operation screen, and display of operation details for operator's understanding in accordance with the necessity of the relevant operation item if needed.

Figure 8:
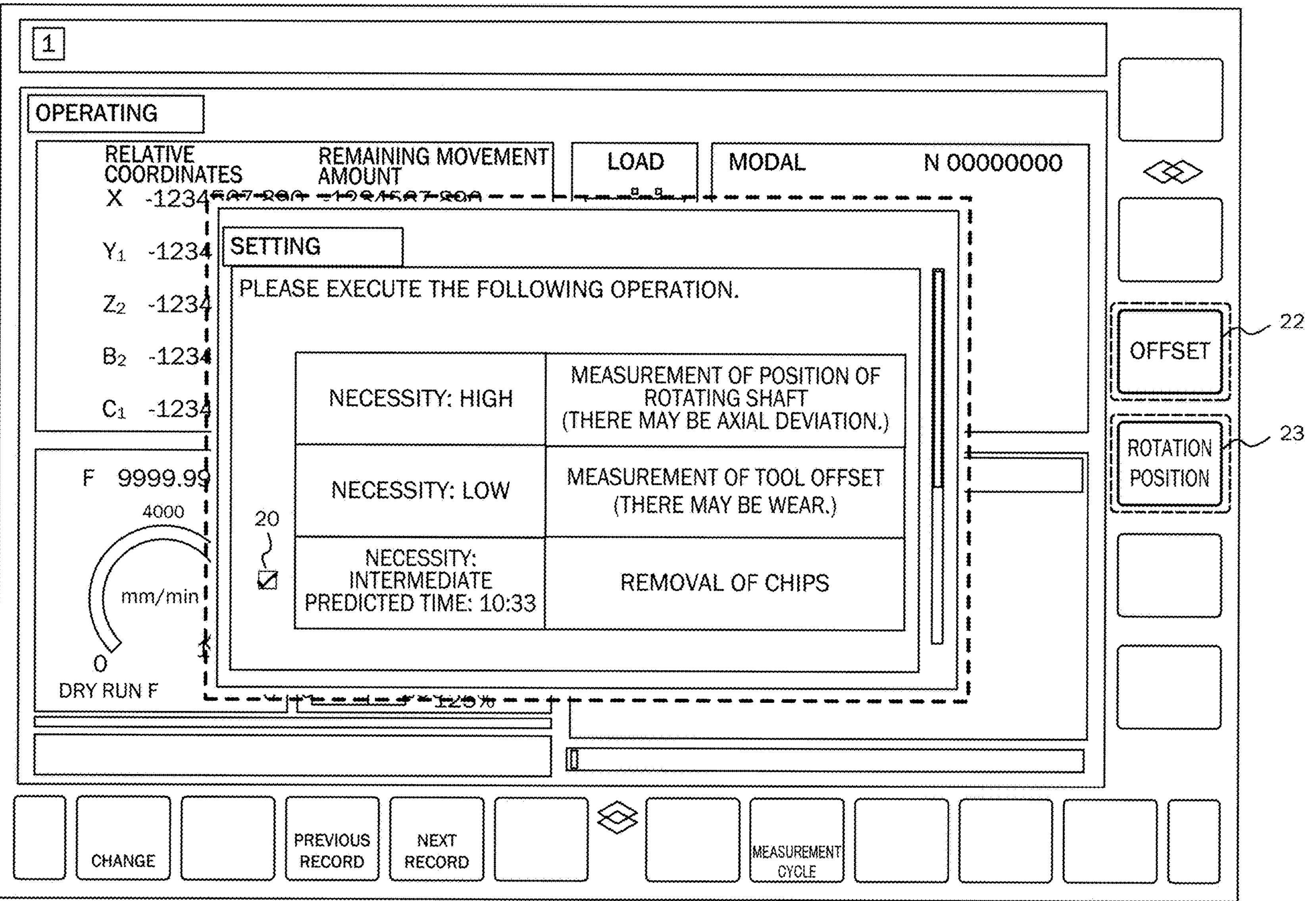
FIG. 8 is a view illustrating an exemplary screen of a list of operation items.

FIG. 8 illustrates a list of operation items that are necessary. The example of FIG. 8 displays as the operation items "measurement of the central axis position of the rotating shaft (there may be axial deviation)", "measurement of tool offset (there may be wear)," and "removal of chips." The necessity of each operation is also displayed. Specifically, the "measurement of the central axis position of the rotating shaft (there may be axial deviation)" has the "necessity: high," the "measurement of tool offset (there may be wear)" has the "necessity: low," and the "removal of chips" has the "necessity: intermediate." For the "removal of chips," a "predicted time: 10 hours and 33 minutes" is also displayed. The operator determines whether to perform all of the operations displayed on the screen or perform only an operation with high necessity by referring to the list of operations.

For example, a plurality of operations to be executed displayed on the screen of the stopped machine tool 200 may help the operator to determine if performing the operations at a time will be more efficient than stopping the machine tool 200 more than once. By displaying the exact time when a given operation should be executed, the operator is able to execute another operation until the time comes. Meanwhile, the operator is also able to execute an operation with low necessity when he/she is available.

The operation item "removal of chips" is provided with a check box 20. Since the numerical control device 100 is unable to confirm the completion of the operation of the "removal of chips," the check box 20 is provided to allow the operator to input the completion of the operation. Since the numerical control device 100 is unable to confirm the completion of the operation of the "re-application of a paste to the tool," either, the check box 20 is provided to allow the operator to input the completion of the operation. When the check box 20 is checked, "the cutting time" and "the number of times of cutting performed" of the operation item "re-application of a paste to the tool" is reset, or "the cutting time" and "the number of times of cutting performed" of the operation item "removal of chips" is reset.

In FIG. 8, a button 22 is a button for jumping to a screen on which "measurement of tool offset" can be performed, and a button 23 is a button for jumping to a screen on which "measurement of the central axis position of the rotating shaft" can be performed. Such buttons are displayed in an emphasized manner to direct the operator on the screen.

Such screens may be displayed not on the numerical control device 100 but on an external information processing device, such as the PC 51, the server 52, and the portable terminal 53.

When the button 23 for jumping to the "screen for measuring the central axis position of the rotating shaft" is selected, the screen indicating the central axis position of the rotating shaft is displayed. The operator is able to execute the operation of "correcting the positional deviation of the central axis of the rotating shaft" while referring to the screen.

Figure 9:
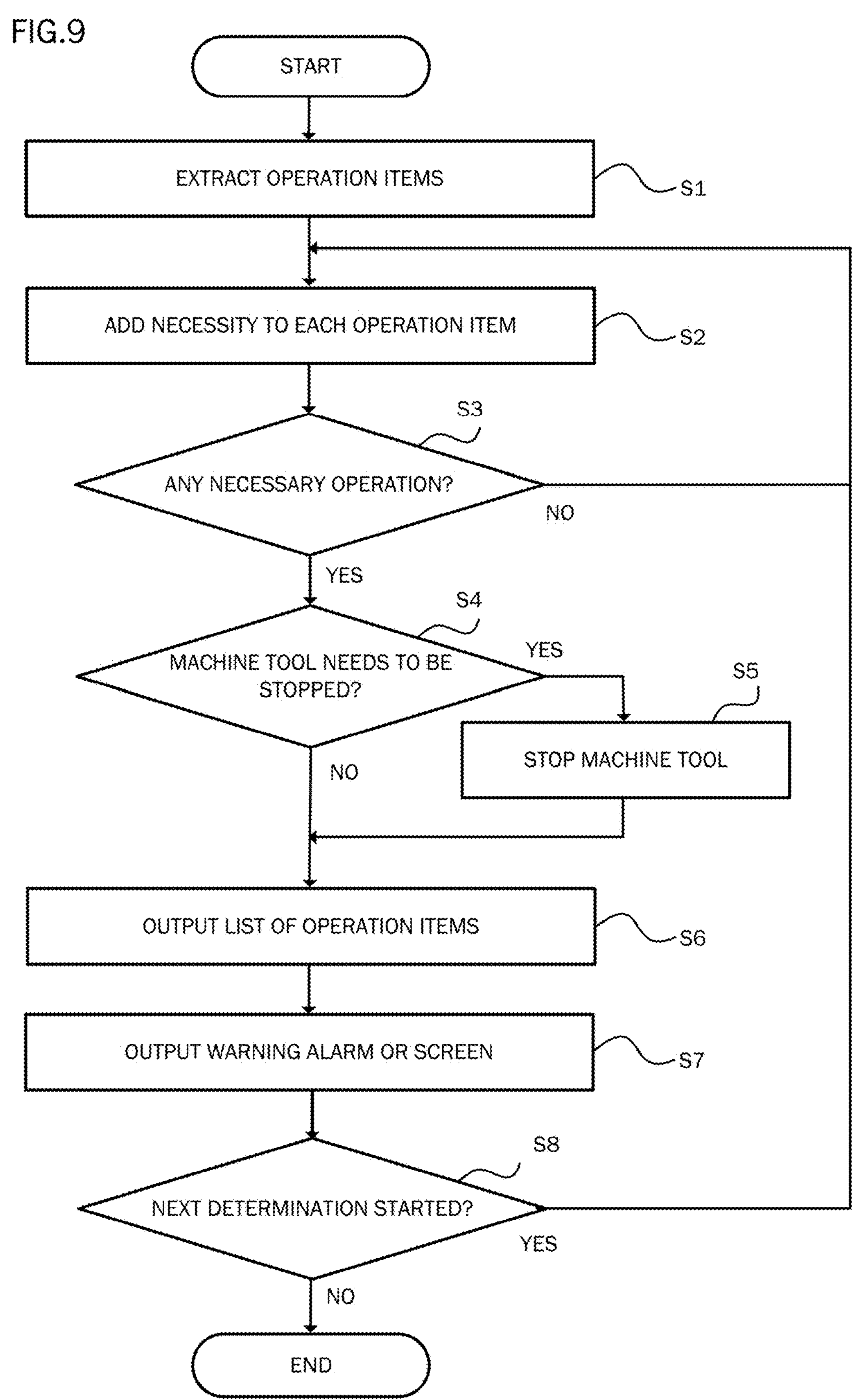
FIG. 9 is a flowchart illustrating the operation of the numerical control device.

FIG. 9 is a flowchart illustrating the operation of the numerical control device 100 of the present disclosure. An operator selects a machining program in accordance with the work instructions, and sets a workpiece. The operation item extraction unit 11 reads the machine configuration information 14 registered on the numerical control device 100.

The operation item extraction unit 11 extracts operation items occurred depending on the operating state of the machine tool 200 (step S1). Examples of the operation items include, but are not limited to, "correction of positional deviation of the central axis of the rotating shaft", "re-measurement of tool offset," "re-application of a paste to the tool", and "removal of chips."

The necessity adding unit 12 adds necessity to each operation item based on the operating time of the machine tool 200 or the sensor value (step S2). Examples of the method of calculating the necessity include a method of "determining the presence or absence of the necessity of the operation," a method of "determining the necessity of the operation in advance," a method of "determining the time necessary to perform the operation," and a method of "representing the necessity by a degree." The necessity may also be calculated based on a combination of a plurality of variables.

The necessity determination unit 13 determines the presence or absence of an operation to be executed by the operator based on a file created by the necessity adding unit 12. If an operation to be executed by the operator is present (step S3; YES), and if the machine tool 200 needs to be stopped (step S4; Yes), the necessity determination unit 13 stops the machine tool 200 before machining of a next workpiece is started or before a next step is started (step S5). After the machine tool 200 is stopped, the flow proceeds to step S6.

If the machine tool 200 needs not be stopped (step S4; No), a list of the operation items is output (step S6). The output destination of the operation items may be the numerical control device 100 or an external information processing device, such as the PC 51, the server 52, and the portable terminal 53.

The numerical control device 100 or the external information processing device outputs a warning alarm or a screen of the list of the operation items, thereby alerting the operator (step S7). The operator executes a necessary operation while referring to the screen.

When the next determination is started (step S8; YES), the numerical control device 100 proceeds to step S2. The result of the determination of the necessity is updated on an as-needed basis. That is, the necessity of each operation item, such as "correction of positional deviation of the central axis of the rotating shaft," "re-measurement of tool offset," "re-application of a paste to the tool," and "removal of chips" changes on an as-needed basis. The numerical control device 100 constantly informs the operator of the necessity of each operation item that changes depending on the operating state of the machine tool 200.

Finally, to terminate the determination of the necessity (step S8; NO), the determination of the necessity is terminated.

Figure 10:
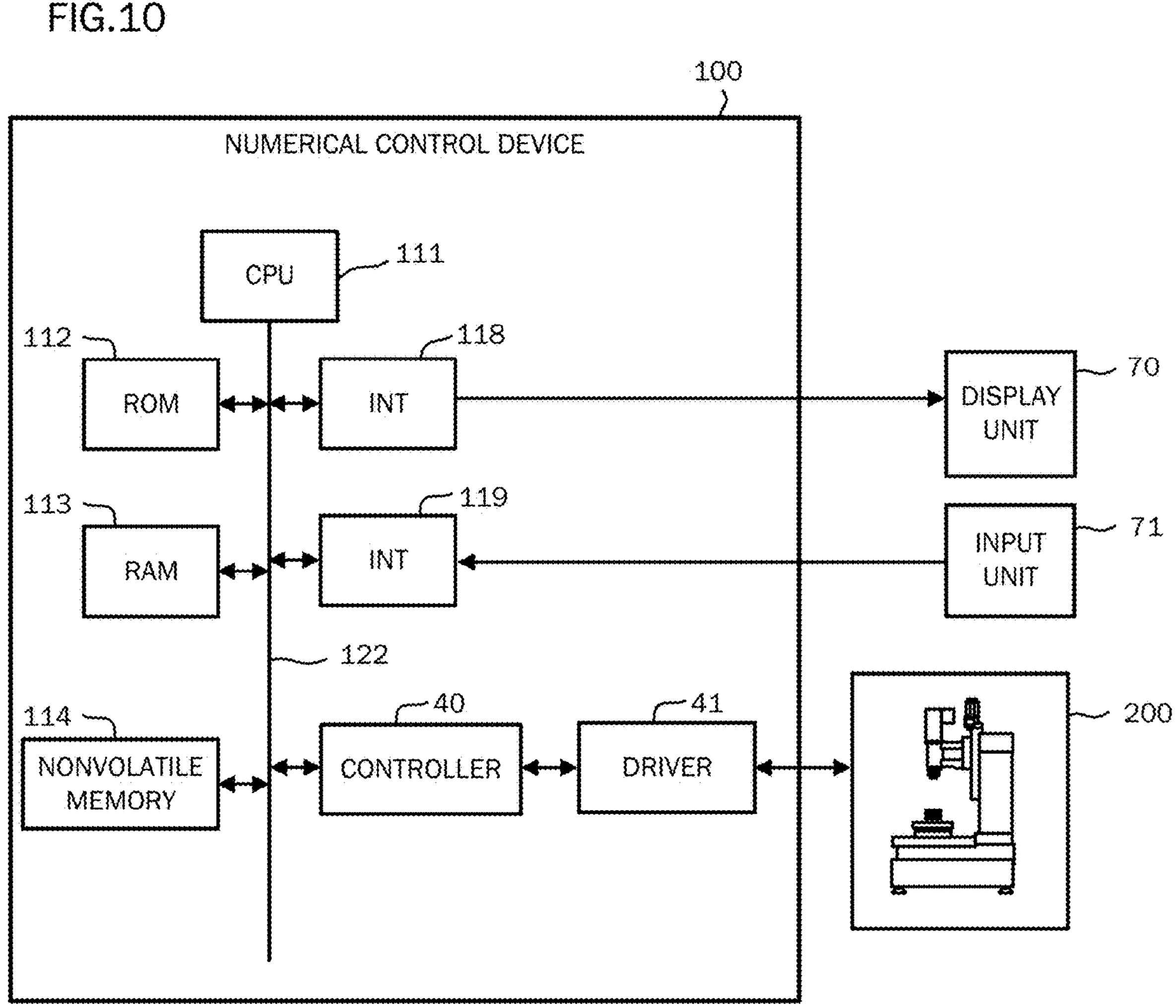
FIG. 10 is a diagram illustrating the hardware configuration of the numerical control device.

The hardware configuration of the numerical control device 100 will be described with reference to FIG. 10. A CPU 111 of the numerical control device 100 is a processor that controls the entire numerical control device 100. The CPU 111 reads a system program stored in a ROM 112 via a bus 122 so as to control the entire numerical control device 100 in accordance with the system program. A RAM 113 temporarily stores temporary calculated data and display data, and various data input by the user via an input unit 71, for example.

A display unit 70 is a monitor as an accessory of the numerical control device 100, for example. The display unit 70 displays an arrangement support screen or an arrangement procedure manual described below, for example.

The input unit 71 is a keyboard or a touch panel, for example, that is integrated with or separate from the display unit 70. The operator inputs information to the screen displayed on the display unit 70 by operating the input unit 71.

A nonvolatile memory 114 is a memory that is backed up with a battery (not illustrated), for example, and thus can retain its memory state even when the numerical control device 100 is powered off. The nonvolatile memory 114 stores a machining program read from an external device via an interface (not illustrated) or a machining program input via the input unit 71, and various data acquired from each unit of the numerical control device 100 and the machine tool 200, for example (e.g., a configuration parameter acquired from the machine tool 200). The program and various data stored in the nonvolatile memory 114 may be loaded into the RAM 113 when executed/used. The ROM 112 has various system programs written thereto in advance.

A controller 40 that controls each shaft of the machine tool 200 converts an instruction to move the shaft from the CPU 111 into a pulse signal, and outputs the pulse signal to a driver 41. The driver 41 converts the pulse signal into a current to drive a servomotor. With the power of the servomotor, the tool or the table is moved. The numerical control device 100 can machine a workpiece by controlling the machine tool 200 in accordance with the machining program.

As described above, the numerical control device 100 as a machining operation assisting device adds necessity to each operation item whose necessity changes depending on the operating state of the machine tool 200. Examples of the necessity include "the presence or absence of the necessity of the operation at present," "the necessity of the operation determined in advance," "the degree of the necessity of the operation," and "the time necessary to perform the operation." The numerical control device 100 assists an operator in determining the necessity of an operation to be executed by displaying a list of operation items and information on the necessity thereof side-by-side. Thus, the operator is able to determine which operation should be preferentially executed by referring to information: an operation whose necessity becomes high in a short period of time; the time for which the necessity of the operation is high; and the degree of the necessity; for example.

The invention claimed is:

1. A machining operation assisting device, comprising:

at least one processor configured to execute processing, as input information, machine configuration information, machining information, and machine state information indicating an operating state of a machine tool, wherein the machine configuration information includes information indicating presence or absence of a rotating axis of the machine tool, the machining information includes information indicating dimensional tolerance or whether a machining operation was performed for a predetermined time, the machine state information includes at least one of temperature, operating time, cutting time of the machine tool, or a torque of the machine tool, the at least one processor is configured to execute:

extracting, based on arithmetic processing using the input information, a plurality of operation items whose necessity changes depending on the operating state of the machine tool, determining the necessity of each operation item of the extracted plurality of operation items by numerical evaluation using the machine state information, wherein the numerical evaluation includes comparison with a plurality of thresholds or calculation of the necessity based on at least two types of the machine state information, adding the determined necessity to said each operation item of the extracted plurality of operation items, based on the necessity, determining whether an operation to be executed by an operator is present for said each operation item of the extracted plurality of operation items, and in response to determining the necessity of at least one operation item, among the extracted plurality of operation items, being equal to or higher than a predetermined level, stopping the machine tool before a next machining operation is started or before a next machining step is started.

2. The machining operation assisting device according to claim 1, wherein the at least one processor is configured to, in response to determining that one of the extracted plurality of operation items has necessity, execute determining that the operation to be executed by the operator is present.

3. The machining operation assisting device according to claim 2, wherein the at least one processor is configured to, in response to determining in advance that the necessity of the one of the extracted plurality of operation items will occur, execute determining that the operation to be executed by the operator is present.

4. The machining operation assisting device according to claim 2, wherein the at least one processor is configured to execute determining that the operation to be executed by the operator is present when a time at which the necessity of the one of the extracted plurality of operation items occurs is determined.

5. The machining operation assisting device according to claim 1, wherein the stopping of the machine tool is executed until an operator operation corresponding to the at least one operation item having the necessity being equal to or higher than the predetermined level is completed.

6. The machining operation assisting device according to claim 5, wherein the at least one processor is configured to further execute generating a file in which the extracted plurality of operation items is associated with corresponding necessities, and outputting the file to an external information processing device.

7. The machining operation assisting device according to claim 1, wherein the at least one processor is configured to execute notifying information relating to the necessity of an operation item of the extracted plurality of operation items to at least one of a display of the machining operation assisting device, a terminal device of the operator, and a computer configured to manage the machine tool in a factory.

8. The machining operation assisting device according to claim 7, wherein the at least one processor is configured to execute causing said at least one of the display of the machining operation assisting device, the terminal device of the operator, and the computer configured to manage the machine tool in the factory to perform at least one of displaying of an operation screen, guiding the operator to the operation screen, and displaying operation details corresponding to an operator operation.

9. A non-transitory computer-readable storage medium storing instructions that, when executed by at least one processor, cause the at least one processor to perform:

processing, as input information, machine configuration information, machining information, and machine state information indicating an operating state of a machine tool, wherein the machine configuration information includes information indicating presence or absence of a rotating axis of the machine tool, the machining information includes information indicating dimensional tolerance or whether a machining operation was performed for a predetermined time, the machine state information includes at least one of temperature, operating time, cutting time of the machine tool, or a torque of the machine tool;

extracting, based on arithmetic processing using the input information, a plurality of operation items whose necessity changes depending on the operating state of the machine tool;

determining the necessity of each operation item of the extracted plurality of operation items by numerical evaluation using the machine state information, wherein the numerical evaluation includes comparison with a plurality of thresholds or calculation of the necessity based on at least two types of the machine state information;

adding the determined necessity to said each operation item of the extracted plurality of operation items;

based on the necessity, determining whether an operation to be executed by an operator is present for said each operation item of the extracted plurality of operation items; and in response to determining the necessity of at least one operation item, among the extracted plurality of operation items, being equal to or higher than a predetermined level, processing to stop the machine tool before a next machining operation is started or before a next machining step is started.

* * * * *